United States Patent
Wang et al.

(10) Patent No.: US 9,699,724 B2
(45) Date of Patent: *Jul. 4, 2017

(54) METHOD, DEVICE, AND SYSTEM FOR REGULATING POWER CONSUMPTION

(71) Applicant: HUAWEI TECHNOLOGIES CO., LTD., Shenzhen (CN)

(72) Inventors: Daowei Wang, Shanghai (CN); Li Chen, Shanghai (CN); Yinghua Huang, Shanghai (CN); Min Huang, Shanghai (CN); Mingzeng Dai, Shanghai (CN); Gang Yu, Shanghai (CN); Bin Xia, Shenzhen (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,335

(22) Filed: May 5, 2016

(65) Prior Publication Data

US 2016/0255582 A1  Sep. 1, 2016

Related U.S. Application Data

(63) Continuation of application No. 14/310,483, filed on Jun. 20, 2014, now Pat. No. 9,369,955, which is a
(Continued)

(30) Foreign Application Priority Data

Apr. 13, 2009  (CN) .......................... 2009 1 0106642

(51) Int. Cl.
*H04W 52/02* (2009.01)
*H04W 52/36* (2009.01)
*H04W 88/08* (2009.01)

(52) U.S. Cl.
CPC ....... *H04W 52/0206* (2013.01); *H04W 52/02* (2013.01); *H04W 52/367* (2013.01);
(Continued)

(58) Field of Classification Search
CPC  H04W 52/0206; H04W 52/02; H04W 52/367
(Continued)

(56) References Cited

U.S. PATENT DOCUMENTS 5,029,183 A * 7/1991 Tymes ................ G06K 7/0008
370/338
5,103,461 A * 4/1992 Tymes ................ G06K 7/0008
370/252
(Continued)

FOREIGN PATENT DOCUMENTS

CN  1674461      9/2005
CN  1816029 A    8/2006
(Continued)

OTHER PUBLICATIONS

Third Office Action, dated Jul. 22, 2013, in corresponding Chinese Application No. 200910106642.9 (14 pp.).
(Continued)

*Primary Examiner* — Hai V Nguyen
(74) *Attorney, Agent, or Firm* — Staas & Halsey LLP

(57) ABSTRACT

A method, device and system for regulating power consumption are provided in the embodiments of the present invention. A method for regulating power consumption includes: obtaining, by a base station, an application point and a configuration parameter; sending, by the base station, an indication message to a terminal according to the application point and configuration parameter; regulating, by the base station, the power consumption of the base station by using the configuration parameter at the application point; the configuration parameter comprises cell antenna infor-
(Continued)

mation or system bandwidth information; the indication message instructs the terminal to use the configuration parameter at the application point. Under the condition that user's normal communication is remained, the number of cell antennas or the cell bandwidth is dynamically changed. This reduces the power consumption of the network device.

13 Claims, 4 Drawing Sheets

Related U.S. Application Data continuation of application No. 13/272,402, filed on Oct. 13, 2011, now Pat. No. 8,792,932, which is a continuation of application No. PCT/CN2010/071724, filed on Apr. 13, 2010.

(52) U.S. Cl.
CPC ........ *H04W 52/0251* (2013.01); *H04W 88/08* (2013.01); *Y02B 60/50* (2013.01)

(58) Field of Classification Search
USPC .............................................. 455/522, 562.1
See application file for complete search history.

(56) References Cited

U.S. PATENT DOCUMENTS

| | | | | |
|---|---|---|---|---|
| 5,142,550 A * | 8/1992 | Tymes | ................. | G06K 7/0008 370/479 |
| 5,157,687 A * | 10/1992 | Tymes | ................. | G06K 7/0008 235/385 |
| 5,280,498 A * | 1/1994 | Tymes | ................. | G06K 7/0008 370/328 |
| 5,455,569 A | 10/1995 | Sherman et al. | | |
| 5,479,441 A * | 12/1995 | Tymes | ................. | G06K 7/0008 375/130 |
| 5,528,621 A * | 6/1996 | Heiman | ............... | G06K 7/0008 375/133 |
| 5,668,803 A * | 9/1997 | Tymes | ................. | G06K 7/0008 340/10.2 |
| 5,982,813 A * | 11/1999 | Dutta | .................... | H04L 1/0003 370/232 |
| 6,192,230 B1 | 2/2001 | Van Bokhorst et al. | | |
| 6,243,050 B1 | 6/2001 | Powell | | |
| 6,334,047 B1 | 12/2001 | Andersson et al. | | |
| 6,430,420 B1 | 8/2002 | Johnson et al. | | |
| 6,519,245 B1 | 2/2003 | Bird | | |
| 6,567,397 B1 | 5/2003 | Campana et al. | | |
| 6,603,751 B1 * | 8/2003 | Odenwalder | ..... | H04W 36/0072 370/331 |
| 6,628,924 B1 * | 9/2003 | Miyamoto | ............ | H04W 52/12 370/318 |
| 6,766,146 B1 | 7/2004 | Park et al. | | |
| 6,804,216 B1 * | 10/2004 | Kuwahara | ............ | H04B 7/2628 370/335 |
| 6,915,116 B2 | 7/2005 | Wang et al. | | |
| 6,917,337 B2 * | 7/2005 | Iida | ....................... | H01Q 3/2605 343/702 |
| 7,027,773 B1 | 4/2006 | McMillin | | |
| 7,062,246 B2 | 6/2006 | Owen | | |
| 7,099,384 B1 | 8/2006 | Jalali et al. | | |
| 7,133,419 B1 | 11/2006 | Hendrichs et al. | | |
| 7,194,274 B2 * | 3/2007 | Voltolina | ............... | H04W 64/00 342/147 |
| 7,200,406 B2 | 4/2007 | Wong et al. | | |
| RE40,032 E | 1/2008 | Van Bokhorst et al. | | |
| RE40,078 E * | 2/2008 | Dutta | .................... | H04L 1/0003 370/232 |
| 7,408,898 B1 | 8/2008 | Brown | | |
| 7,421,251 B2 | 9/2008 | Westwick et al. | | |
| 7,486,936 B2 | 2/2009 | Kappes et al. | | |
| 7,583,625 B2 | 9/2009 | Bennett | | |
| 7,653,386 B2 | 1/2010 | Bennett | | |
| 7,653,394 B2 | 1/2010 | McMillin | | |
| RE41,471 E | 8/2010 | Wood, Jr. | | |
| 7,778,643 B2 | 8/2010 | Laroia et al. | | |
| 7,830,838 B2 | 11/2010 | Kohvakka et al. | | |
| 7,889,777 B2 | 2/2011 | Rujiter | | |
| 7,969,300 B2 | 6/2011 | Coronel et al. | | |
| 8,005,510 B2 * | 8/2011 | Fischer | ............... | H04M 3/5158 455/561 |
| 8,005,515 B1 | 8/2011 | Chhabra et al. | | |
| 8,019,303 B2 | 9/2011 | Liu et al. | | |
| 8,032,083 B2 | 10/2011 | Mosker et al. | | |
| 8,041,353 B2 * | 10/2011 | Kazmi | ................. | H04J 11/0093 455/434 |
| 8,050,203 B2 | 11/2011 | Jacobsen et al. | | |
| 8,103,302 B2 * | 1/2012 | Haartsen | ............. | H04W 72/085 455/450 |
| 8,139,528 B2 | 3/2012 | Gupta et al. | | |
| 8,150,443 B2 | 4/2012 | Pedersen et al. | | |
| 8,160,510 B2 | 4/2012 | Kanou | | |
| 8,175,661 B2 | 5/2012 | Park et al. | | |
| 8,179,926 B2 * | 5/2012 | Futami | .................. | H04L 25/022 370/328 |
| 8,315,676 B2 | 11/2012 | Chhabra et al. | | |
| 8,325,701 B2 | 12/2012 | Yamauchi et al. | | |
| 8,406,259 B2 | 3/2013 | Lee et al. | | |
| 8,428,650 B2 | 4/2013 | Pottenger et al. | | |
| 8,442,076 B1 | 5/2013 | Khlat | | |
| 8,463,309 B2 * | 6/2013 | Malladi | ................. | H04W 52/16 370/318 |
| 8,494,539 B1 * | 7/2013 | Surazski | ............. | H04L 12/5693 370/338 |
| 8,498,592 B2 * | 7/2013 | Mishra | .................. | H04L 43/028 370/318 |
| 8,620,332 B2 | 12/2013 | Laroia et al. | | |
| 8,625,527 B2 * | 1/2014 | Zhu | .................... | H04W 36/0022 370/331 |
| 8,660,104 B2 | 2/2014 | Rofougaran | | |
| 8,792,932 B2 * | 7/2014 | Wang | ................ | H04W 52/0206 455/522 |
| 8,811,252 B2 * | 8/2014 | Maeda | .................. | H04L 5/0007 370/312 |
| 8,855,279 B2 * | 10/2014 | Forbes, Jr. | ............. | G06Q 10/00 379/1.03 |
| 8,897,780 B2 * | 11/2014 | Lindoff | ............ | H04W 52/0232 455/436 |
| 8,902,830 B2 * | 12/2014 | Nimbalker | ........ | H04W 52/0206 370/329 |
| 9,048,913 B2 * | 6/2015 | Kludt | ................... | H04B 7/0689 |
| 9,369,955 B2 * | 6/2016 | Wang | ................ | H04W 52/0206 |
| 2001/0024964 A1 | 9/2001 | Wang et al. | | |
| 2004/0229621 A1 * | 11/2004 | Misra | ................... | H04W 16/08 455/445 |
| 2005/0197147 A1 | 9/2005 | Stephens et al. | | |
| 2005/0239475 A1 * | 10/2005 | Voltolina | .............. | H04W 64/00 455/456.1 |
| 2005/0245280 A1 * | 11/2005 | Liu | .......................... | H04B 7/04 455/522 |
| 2005/0255891 A1 | 11/2005 | Takai | | |
| 2006/0215592 A1 * | 9/2006 | Tomoe | .................... | H04L 45/00 370/315 |
| 2006/0240834 A1 * | 10/2006 | Sawaya | ................ | H04W 16/18 455/446 |
| 2007/0086367 A1 * | 4/2007 | Sung | ..................... | H04L 1/1874 370/278 |
| 2007/0129094 A1 * | 6/2007 | Jeong | ................. | H04W 52/146 455/522 |
| 2007/0155375 A1 * | 7/2007 | Kappel | .................. | H04W 24/04 455/422.1 |
| 2007/0223426 A1 | 9/2007 | Proctor | | |
| 2008/0043928 A1 | 2/2008 | Zhou | | |
| 2008/0070586 A1 | 3/2008 | Kermoal et al. | | |
| 2008/0081645 A1 | 4/2008 | Kim et al. | | |
| 2008/0164996 A1 | 7/2008 | Coronel et al. | | |
| 2009/0061799 A1 | 3/2009 | Park et al. | | |
| 2009/0067356 A1 | 3/2009 | Sakamoto et al. | | |

(56) References Cited

U.S. PATENT DOCUMENTS

| | | | |
|---|---|---|---|
| 2009/0069057 A1* | 3/2009 | Haartsen | H04W 72/085 455/574 |
| 2009/0093281 A1 | 4/2009 | Demirhan et al. | |
| 2009/0111503 A1 | 4/2009 | Pedersen et al. | |
| 2009/0135536 A1 | 5/2009 | Kappes et al. | |
| 2009/0176490 A1* | 7/2009 | Kazmi | H04J 11/0093 455/434 |
| 2009/0185542 A1 | 7/2009 | Zhang et al. | |
| 2009/0202013 A1 | 8/2009 | Sebastian | |
| 2009/0291705 A1 | 11/2009 | Bennett | |
| 2009/0318177 A1* | 12/2009 | Wang | H04W 68/025 455/515 |
| 2010/0009694 A1* | 1/2010 | Fischer | H04M 3/5158 455/452.1 |
| 2010/0016023 A1 | 1/2010 | Yamauchi et al. | |
| 2010/0046481 A1 | 2/2010 | Chen et al. | |
| 2010/0075689 A1 | 3/2010 | Uemura et al. | |
| 2010/0081469 A1 | 4/2010 | Kazmi et al. | |
| 2010/0091714 A1 | 4/2010 | Bennett | |
| 2010/0272004 A1* | 10/2010 | Maeda | H04L 5/0007 370/312 |
| 2011/0029655 A1* | 2/2011 | Forbes, Jr. | G06Q 10/00 709/223 |
| 2011/0051640 A1* | 3/2011 | Ramesh | H04W 48/14 370/311 |
| 2011/0103363 A1 | 5/2011 | Bennett | |
| 2011/0305264 A1 | 12/2011 | Chhabra et al. | |
| 2012/0034948 A1* | 2/2012 | Wang | H04W 52/0206 455/522 |
| 2012/0143383 A1* | 6/2012 | Cooperrider | H04Q 9/00 700/295 |
| 2012/0295670 A1 | 11/2012 | Rofougaran | |
| 2013/0077549 A1 | 3/2013 | Chhabra et al. | |
| 2013/0163564 A1* | 6/2013 | Pani | H04W 36/0055 370/332 |
| 2014/0302891 A1* | 10/2014 | Wang | H04W 52/0206 455/562.1 |
| 2014/0362756 A1* | 12/2014 | Maeda | H04L 5/0007 370/312 |

FOREIGN PATENT DOCUMENTS

| | | |
|---|---|---|
| CN | 101114861 | 1/2008 |
| CN | 101449525 A | 6/2009 |
| CN | 101860918 B | 7/2014 |
| EP | 1843482 A2 | 10/2007 |
| EP | 1876727 | 1/2008 |
| EP | 1983783 | 10/2008 |
| JP | 2002-77010 | 3/2002 |
| JP | 2006-238314 | 9/2006 |
| JP | 2007214824 | 8/2007 |
| JP | 2008-22173 | 1/2008 |
| JP | 2008017096 | 1/2008 |
| WO | 98/57516 | 12/1998 |
| WO | 00/13260 | 3/2000 |
| WO | 2007-125462 | 11/2007 |
| WO | 2009041871 A1 | 4/2009 |

OTHER PUBLICATIONS

Notice of Reasons for Rejection, dated Jul. 29, 2013, in corresponding Japanese Application No. 2012-505034 (7 pp.).
Communication Pursuant to Article 94 (3) EPC, dated Aug. 13, 2013, in corresponding European Application No. 10764089.8 (5 pp.).
Chinese Office Action mailed Jan. 14, 2013 in corresponding Chinese Application No. 200910106642.9.
Written Opinion of the International Searching Authority mailed Jul. 22, 2010 issued in corresponding International Patent Application No. PCT/CN2010/071724.
Extended European Search Report dated Feb. 24, 2012 issued in corresponding European Patent Application No. 10764089.8.
International Search Report mailed Jul. 22, 2010 in corresponding International Patent Application No. PCT/CN2010/071724.
First Chinese Office Action mailed May 3, 2012 in corresponding Chinese Patent Application No. 200910106642.9.
Japanese Office Action mailed Apr. 2, 2013 in corresponding Japanese Patent Application No. 2012-505034.
Notice of Allowance mailed Jan. 29, 2014 in corresponding Japanese Patent Application No. 2012-505034 (3 pages).
Non-Final Office Action dated Nov. 7, 2013 in parent U.S. Appl. No. 13/272,402 (17 pages).
Notice of Allowance mailed Mar. 20, 2014 in parent U.S. Appl. No. 13/272,402 (12 pages).
Non-Final Office Action dated Sep. 14, 2015 in corresponding U.S. Appl. No. 14/310,483 (19 pages).
Notice of Allowance mailed Mar. 11, 2016 in corresponding U.S. Appl. No. 14/310,483 (12 pages).
U.S. Appl. No. 13/272,402, filed Oct. 13, 2011, Daowei Wang et al., Huawei Technologies Co., LTD. Shenzhen, P.R. China.
U.S. Appl. No. 14/310,483, filed Jun. 20, 2014, Daowei Wang et al., Huawei Technologies Co., LTD. Shenzhen, P.R. China.

* cited by examiner

METHOD, DEVICE, AND SYSTEM FOR REGULATING POWER CONSUMPTION

CROSS-REFERENCE TO RELATED APPLICATIONS

This application is a continuation of U.S. patent application Ser. No. 14/310,483, filed on Jun. 20, 2014, which is a continuation of U.S. patent application Ser. No. 13/272,402, filed on Oct. 13, 2011, now U.S. Pat. No. 8,792,932, which is a continuation of a continuation of International Application No. PCT/CN2010/071724, filed on Apr. 13, 2010. The International Application claims priority to Chinese Patent Application No. 200910106642.9, filed on Apr. 13, 2009. The afore-mentioned patent applications are hereby incorporated by reference in their entireties.

FIELD OF THE INVENTION

The present invention relates to communications technologies, and in particular, to a method, device, and system for regulating power consumption.

BACKGROUND OF THE INVENTION

The cost of telecommunication network operators includes two parts: the capital expenditure (CAPEX: Capital Expenditure) such as network devices, computers, and instruments; and daily operating expenditure (OPEX: Operating Expenditure). At present, the OPEX becomes an important part concerned by operators. For a mobile operator, the cost of the electricity energy consumption accounts for a huge part in the OPEX. Most electricity energy is consumed by the power amplifier of transmit signals. In a LTE (long term evolution) system, the downstream reference signals are necessary for downstream data receiving. Even though there is no data to be sent, the base station needs to regularly transmit downstream reference signals. The factors affecting the transmit power of downstream reference signals are the number of downstream reference signals and the power spectrum density (PSD) of downstream reference signals.

SUMMARY OF THE INVENTION

Embodiments of the present invention provide a method, device, and system for regulating power consumption. The technical solution is as follows:

A method for regulating power consumption includes: obtaining, by a base station, an application point and a configuration parameter; sending, by the base station, an indication message to a terminal according to the application point and configuration parameter; and using, by the base station, the configuration parameter at the application point. The configuration parameter includes cell antenna information or cell system bandwidth information, and the indication message instructs the terminal to use the configuration parameter at the application point.

A base station includes: an information obtaining unit, configured to obtain application point and configuration parameter; a sending unit, configured to send an indication message to a terminal according to the application point and configuration parameter obtained by the information obtaining unit; and an executing unit, configured to regulate the power consumption of the base station by using the configuration parameter at the application point according to the application point and configuration parameter obtained by the information obtaining unit. The configuration parameter includes cell antenna information or system bandwidth information, and the indication message instructs the terminal to use the configuration parameter at the application point.

A method for regulating power consumption includes: receiving, by a terminal, an indication message from a base station and obtaining information about application point and configuration parameter; and using, by the terminal, the configuration parameter at the application point according to the application point information. The configuration parameter includes cell antenna information or cell system bandwidth information; and the indication message is configured to instruct the terminal to use the configuration parameter at the application point, and the base station is configured to use the configuration parameter at the application point.

A system for regulating power consumption includes a base station, configured to implement all functions of the base station in the preceding method for regulating power consumption.

The base station according to the embodiments of the present invention sends an indication message to the terminal so that the base station and terminal use the configuration parameter including a change of the number of cell antennas or a change of system bandwidth. Therefore, with the technical solution provided in the present invention, under the condition of maintaining user normal communication, the number of cell antennas or the system bandwidth are dynamically changed so that the number of downstream reference signals is dynamically adjusted. This reduces the power consumption of the base station and accordingly cuts down the telecommunication carrier's daily OPEX.

DETAILED DESCRIPTION OF THE EMBODIMENTS

According to embodiments of the present invention, when cell antenna information or system bandwidth changes, a base station obtains application point and configuration parameter, sends an indication message to a terminal according to the application point and configuration parameter, and the base station uses the configuration parameter at the application point. The configuration parameter includes cell antenna information or system bandwidth information; and the indication message instructs the terminal to use the configuration parameter at the application point.

According to embodiments of the present invention, through setting effective time (that is, an application point), the terminal and the base station use, at the same time, the configuration parameter including the change of the number of cell antennas or the change of system bandwidth at the application point, so that user communication remains normal when the number of cell antennas or system bandwidth is changed. Further, the base station initiates a process for changing the number of cell antennas and the system bandwidth, which reduces the number of downstream reference signals, and therefore the power consumption of the base station is reduced.

The following makes further description with embodiments and accompanying drawings.

Figure 1:
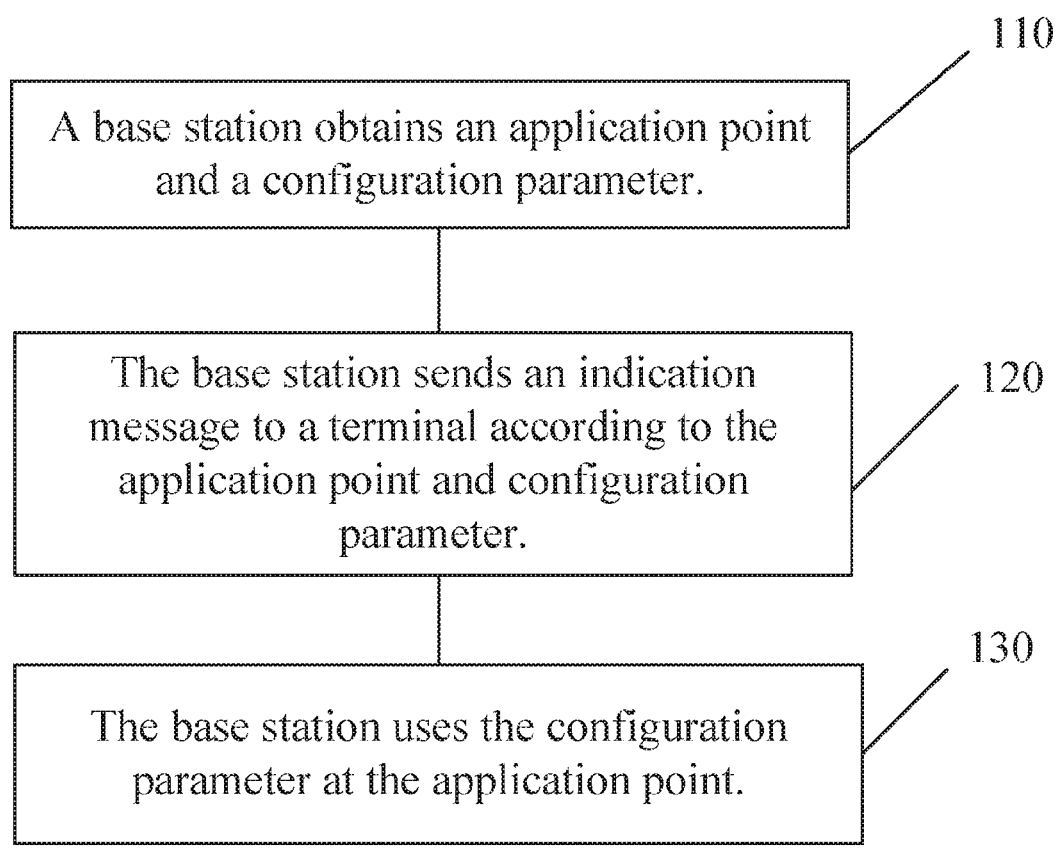
FIG. 1 is a schematic flowchart of a method for regulating power consumption according to an embodiment of the present invention.

As shown in FIG. 1, an embodiment of the present invention provides a method for regulating power consumption. The method includes the following:

110: A base station obtains application point and configuration parameter.

In this embodiment, the base station obtains application point and configuration parameter when initiating a process for changing the number information of cell antennas information or system bandwidth information. According to a detected fault, the base station determines that the number of cell antennas information or the system bandwidth information changes, and then initiates a process for changing the number of cell antennas information or the system bandwidth information. The base station also initiates, according to a trigger factor, a process for changing the number of cell antennas information or the system bandwidth information.

When detecting a fault on radio frequency (RF) channels and a fault causing the change of the number of cell antennas and the change of the system bandwidth, the base station initiates a process for changing the number of cell antennas information or system bandwidth information according to the detected fault.

A trigger factor triggering the process for changing the number of cell antennas or system bandwidth that is initiated by the base station includes at least one of: cell load, a selected time point, and traffic. The following section uses examples to describe the above-mentioned trigger factors.

When the trigger factor is the cell load, the network side determines, according to the current cell load, whether the system bandwidth or the number of antennas needs to be dynamically changed. If the current cell load is smaller than or equal to the threshold of the cell load, the system bandwidth or the number of cell antennas may be reduced. If the current cell load is larger than or equal to the threshold of the cell load, the system bandwidth or the number of cell antennas needs to be increased.

When the trigger factor is the selected time point, the network side initiates the reduction or restoration of the system bandwidth or the number of antennas according to the selected time point. The time point may be a time on every day, and/or some day.

When the trigger factor is the traffic, the network side determines, according to the traffic, whether to reduce or restore the system bandwidth or the number of antennas. If the traffic is smaller than a preset threshold, the system bandwidth or the number of cell antennas may be reduced. If the traffic is larger than a preset threshold, the system bandwidth or the number of antennas needs to be increased within an upper limit of the system bandwidth or the number of antennas.

It should be noted that these trigger factors are described for illustration only and are not intended to limit the trigger factors in embodiments of the present invention. Those skilled in the art should understand that various modifications or equivalent replacements can be made to the trigger factors according to the embodiments of the present invention. Such modifications and equivalent replacements fall into the protection scope of the invention.

Because the content included in the trigger factors of the change of the number of cell antennas or the change of the system bandwidth that are initiated by the base station is described in the embodiment, the trigger factors are not described again in the following embodiment involving trigger factors. For specific trigger factors, refer to the description in the embodiment.

The application point indicate the configuration parameter used at a starting point of a modification period (modification period) of a system message or used by a system frame number (System Frame Number, SFN) of other SFNs except the starting point of the modification period of a system message. The configuration parameter include:

(1) Information about the number of cell antennas or the system bandwidth to be changed (2) Indication information indicating the change of the number of cell antennas or the change of the system bandwidth.

It should be noted that, in the configuration parameter, the information about the number of cell antennas or the system bandwidth to be changed configuration parameter, and the indication information indicating either the change of the number of cell antennas or the change of the system bandwidth, may not be included in the indication message sent by the base station and may not be preset on the base station and terminal either. The terminal obtains, by detecting and reading system broadcast messages, the information about the number of cell antennas or the system bandwidth to be changed.

The configuration parameter may further include the following:

1) Information about a transmission mode after the number of cell antennas is changed. In the LTE system, when the number of cell antennas is changed, the transmission mode needs to be changed. The relationship between the number of cell antennas and the transmission mode is shown in Table 1. It should be noted that the information about a transmission mode configuration parameter after the number of cell antennas, included in the configuration parameter, is changed can be preset on the base station and terminal.

TABLE 1

| Transmission mode | Description | Efficient antenna configuration |
| --- | --- | --- |
| 1 | Single antenna (port 0) | 1, 2, 4 |
| 2 | Transmit diversity | 2, 4 |
| 3 | Open loop space division multiplexing (SDM) | 2, 4 |
| 4 | close loop SDM | 2, 4 |
| 5 | Multiple user MIMO | 2, 4 |
| 6 | Close loop rank = 1 pre-coding | 2, 4 |
| 7 | Single antenna, port 5 (beamforming) | 1, 2, 4 |

2) Corresponding system information, for example, MIB (management information block), SIB1 (system information block 1), and SIB2 (system information block 2).

This embodiment describes the content of the configuration parameter. When the following embodiment involves the configuration parameter, no detailed description is provided. The content of the configuration parameter can be referred to in this embodiment.

120: The base station sends an indication message to a terminal according to the application point and configuration parameter.

The application point and configuration parameter can be included in the indication message sent by the base station, and are sent to the terminal through the indication message.

The indication message can be a paging message, or a radio resource control connection reconfiguration message (Radio Resource Control Connection Reconfiguration message), or a newly-added message. The indication message indicates a change of the number of cell antennas or a change of system bandwidth. The terminal obtains the application point and configuration parameter according to the instruction in the indication message and uses the configuration parameter at the application point.

130: The base station uses the configuration parameter at the application point.

The base station uses the configuration parameter at the application point, and performs the operation of the change of the system bandwidth or the change of the number of cell antennas. At the time, the terminal should also use the configuration parameter at the application point, and perform the operation of the change of the system bandwidth or the change of the number of cell antennas.

Figure 2:
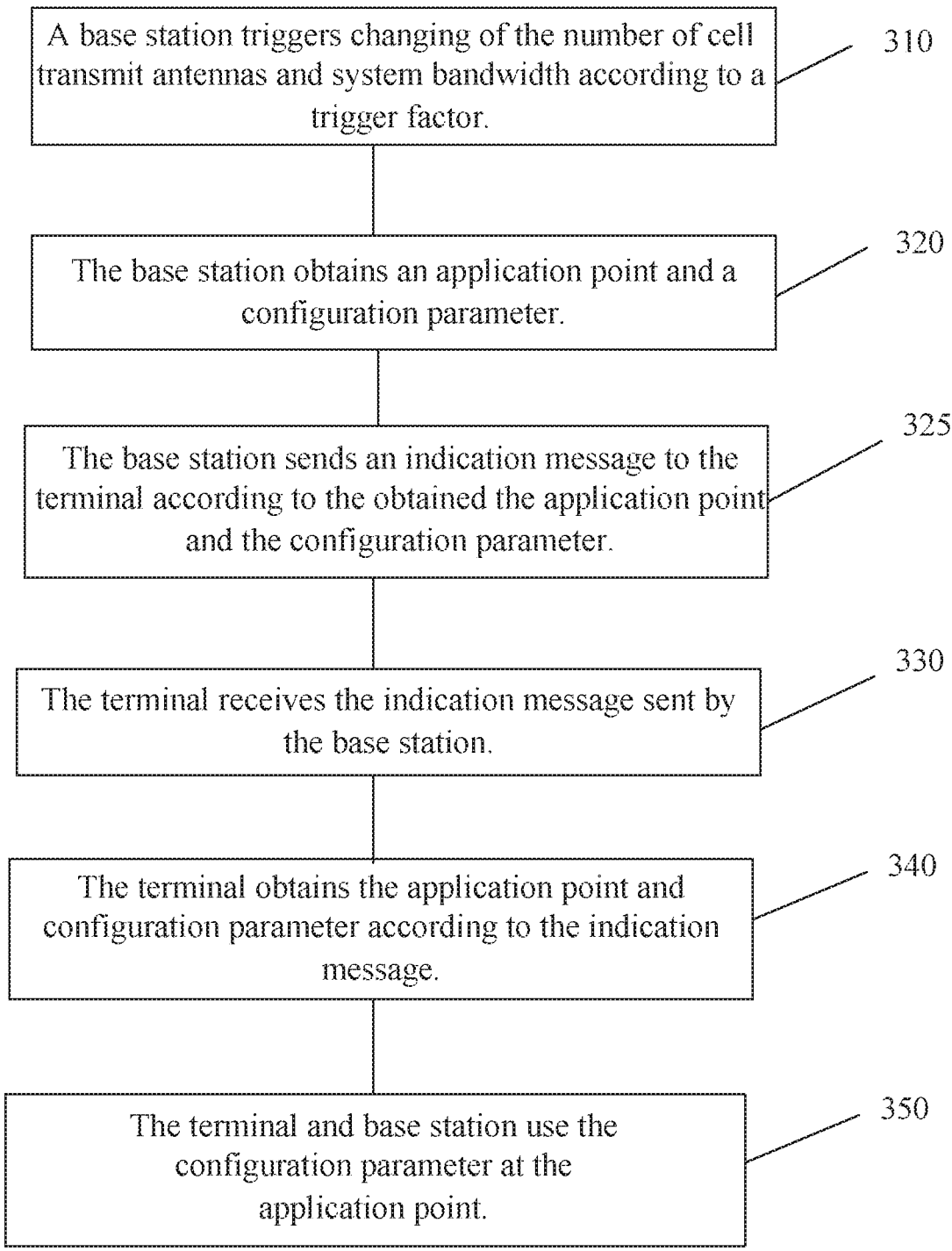
FIG. 2 is a schematic flowchart of another method for regulating power consumption according to an embodiment of the present invention.

With the method for regulating power consumption provided in this embodiment, the base station initiates, according to the detected faults or the trigger factors, a process for changing the number of cell antennas and cell system bandwidth, sends the indication message to the terminal so that the terminal and base station use the configuration parameter including the change of the number of cell antennas or the change of system bandwidth at the same time at the application point. Therefore, under the condition that user's normal communication may be remained, the number of cell antennas or the system bandwidth is dynamically changed so that the number of downstream reference signals is dynamically adjusted. This reduces the power consumption of the base station. As shown in FIG. 2, an embodiment of the present invention provides another method for regulating power consumption. According to the method, a base station initiates a process for changing the number of cell antennas or the system bandwidth, and the terminal and base station use configuration parameter at configuration points. The embodiment describes the method for regulating power consumption using an idle terminal and a connected terminal as examples. The method includes the following:

310: A base station triggers changing of the number of cell transmit antennas or system bandwidth according to trigger factors.

320: The base station obtains application point and configuration parameter.

In the case of an idle terminal:

The applications point is the starting point of the modification period of the system message or other system SFNs except the starting point of the modification period of the system message after the first modification period of a system message.

The application point and configuration parameter can be included in the indication message sent by the base station, and are sent to the terminal through the indication message. Optionally, the terminal may obtain application point information by detecting and/or reading system broadcast messages sent by the base station.

In the case of a connected terminal:

The application point and configuration parameter may be included in the indication message. The application point is starting point of modification periods of a system message or other SFNs except the starting point of the modification periods of a system message.

The configuration parameter include the number of cell antennas or the system bandwidth to be changed and indication information indicating either a change of the number of cell antennas or a change of the system bandwidth.

In addition, the configuration parameter also includes system information affecting connection status of the terminal, and information about a transmission mode after the number of cell antennas is changed.

325: The base station sends an indication message to the terminal according to the obtained application point and configuration parameter.

In the case of an idle terminal:

The base station sends an indication message to the terminal within a first modification period of a system message to notify the terminal that the system bandwidth or the number of cell antennas is to be changed.

The indication message is a paging message indicating a change of the number of cell antennas or a change of the system bandwidth, or a paging message including change information about the system broadcast messages.

In the case of a connected terminal:

The base station sends an indication message to the terminal before the change of the number of cell antennas or the change of the system bandwidth.

The indication message may be either a newly-added message or a radio resource control connection reconfiguration message.

330: The terminal receives the indication message sent by the base station.

340: Corresponding to the indication message, the terminal obtains the application point and configuration parameter.

In the case of an idle terminal:

When receiving the indication message, the terminal learns that the system bandwidth or the number of cell antennas is to be changed. At the starting point of modification periods of a system message (the starting point of a next modification period of a system message), the base station sends a new system broadcast message, and the terminal reads the message, detects the message, and obtains the configuration parameter including the number of cell antennas and the system bandwidth to be changed. In such a case, the configuration parameter include the number of cell antennas or the system bandwidth to be changed and indication information indicating either a change of the number of cell antennas or a change of the system bandwidth, and may further include the information about a transmission mode and system information affecting connection status of the terminal after the number of cell antennas is changed.

In the case of a connected terminal:

If the indication message includes application point and configuration parameter, the terminal can obtain the application point and configuration parameter from the indication message.

350: The terminal and base station use the configuration parameter at the application point.

In the case of an idle terminal:

The terminal and base station change the number of cell antennas or the system bandwidth at the application point according to the information about the configuration parameter. The application point may be the starting point of a second modification period of a system message; the second modification period of a system message may be the next modification period of a first system message following the first modification period of a system message, or any next modification period after the first modification period of a system message. The application point may also be an SFN that is specified in the configuration parameter and follows the first modification period of a system message.

In the case of a connected terminal:

The terminal and base station change the number of cell antennas or the system bandwidth at the application point according to the information about the configuration parameter.

With the method for regulating power consumption provided in this embodiment, the base station initiates the process for changing the number of cell antennas and cell system bandwidth, sends the indication message to the idle terminal so that the terminal and base station use the configuration parameter including the change of the number of cell antennas or the change of system bandwidth at the application point. Therefore, the number of cell antennas or the system bandwidth is dynamically changed so that the number of downstream reference signals is dynamically adjusted. This reduces the power consumption of the base station.

Further, with the method for regulating power consumption provided in this embodiment, the idle terminal learns, according to the instruction in the received indication message, that the number of cell antennas or the system bandwidth is to be changed, and uses the configuration parameter including the change of the number of cell antennas or the change of system bandwidth at the application point and base station. This ensures the normal communication service between the base station and terminal when the number of cell antennas or the system bandwidth is changed.

Furthermore, with the method for regulating power consumption provided in this embodiment, the connected terminal learns, according to the instruction in the received indication message, that the number of cell antennas or the system bandwidth is to be changed, and uses the configuration parameter including the change of the number of cell antennas or the change of system bandwidth at the application point and base station. This ensures the continuity of the communication service between the base station and terminal when the number of cell antennas or the system bandwidth is changed.

Furthermore, with the method for regulating power consumption provided in this embodiment, the indication message sent by the base station may include the configuration parameter which is needed for changing the number of cell antennas or the system bandwidth. Some information in the configuration parameter is optional, such as system information MIB, SIB1, and SIB2. The connection status of the terminal may be affected by system information such as MIB, SIB 1, and SIB 2. If the configuration parameter of the connected terminal sent by the base station include the system information MIB, SIB 1, and SIB 2, the connected terminal does not need to read the system information MIB, SIB 1, and SIB 2, so that the interruption time of the terminal service can be reduced. Optionally, if the configuration parameter includes no system information MIB, SIB 1, and SIB 2, the connected terminal needs to read the system information MIB, SIB 1, and SIB 2, which may cause a short, for example, 200 ms, service interruption for the connected terminal, which is tolerable.

Figure 3:
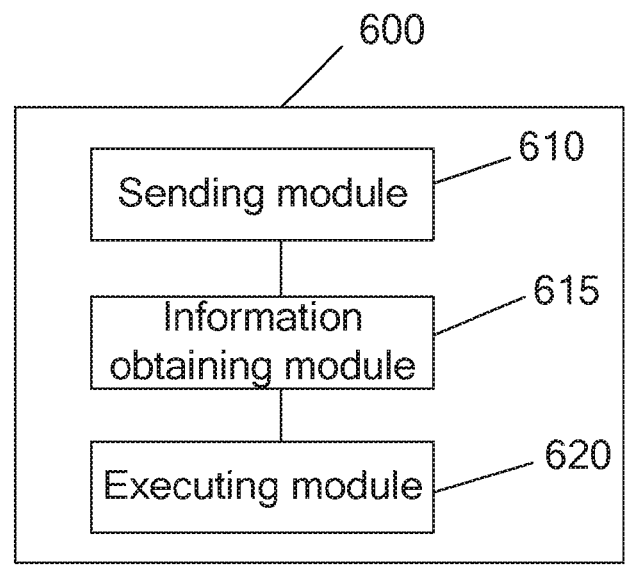
FIG. 3 is a schematic unit of a base station according to an embodiment of the present invention.

As shown in FIG. 3, an embodiment of the present invention provides a base station 600, including:

an information obtaining unit 615, configured to obtain application point and configuration parameter;

a sending unit 610, configured to send an indication message to a terminal according to the application point and configuration parameter obtained by the message obtaining unit 615; and an executing unit 620, configured to regulate power consumption of the base station by using the configuration parameter at the application point according to the application point and configuration parameter that are obtained by the information obtaining unit 615.

The configuration parameter includes the information about the number of cell antennas and the system bandwidth. The indication message instructs the terminal to use the configuration parameter at the application point.

Figure 4:
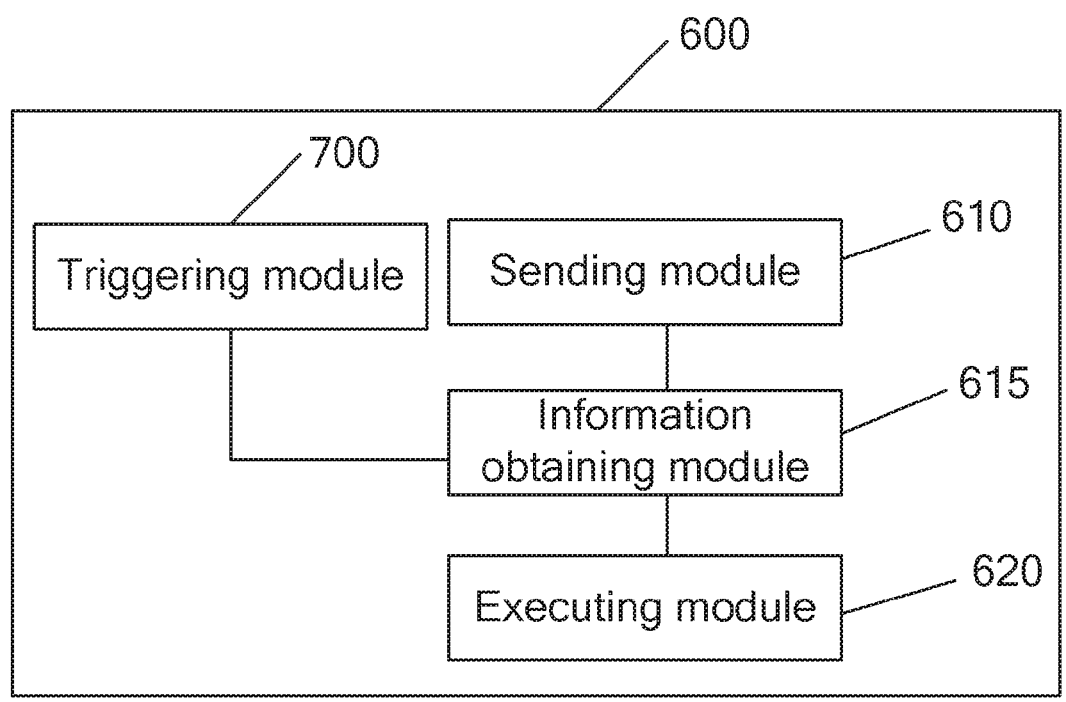
FIG. 4 is a schematic unit of another base station according to an embodiment of the present invention.

Further, as shown in FIG. 4, the base station 600 further includes:

a triggering unit 700, configured to trigger the obtaining unit 615 to obtain the application point and configuration parameter according to a trigger factor;

The trigger factor may be one of cell load, a selected time point, and traffic.

In this embodiment, the application point are starting point of modification periods of a system message or other SFNs except the starting point of the modification periods of a system message.

Further, the indication message is a paging message indicating a change of the number of cell antennas or a change of the system bandwidth, or a radio resource control connection reconfiguration message.

Further, the indication message includes the application point and configuration parameter.

Further, the configuration parameter includes the indication information indicating a change of the number of cell antennas or a change of the system bandwidth. The configuration parameter may further include system information affecting connection status of the terminal, and information about a transmission mode after the number of cell antennas is changed.

Further, the application point is the time points preset on the base station; the configuration parameter is cell antenna information or system bandwidth information preset on the base station.

Figure 5:
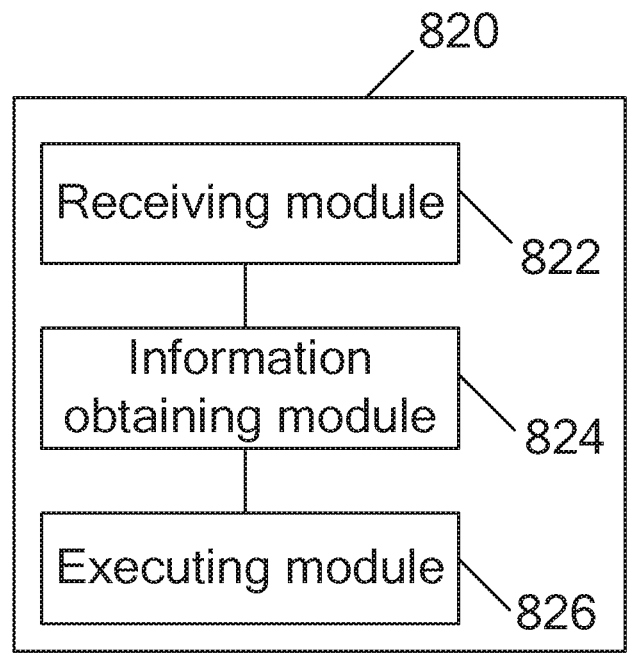
FIG. 5 is a schematic unit of a terminal according to an embodiment of the present invention.

As shown in FIG. 5, an embodiment of the present invention provides a terminal 820, including: a receiving unit 822, an information obtaining unit 824, and an executing unit 826.

The receiving unit 822 is configured to receive an indication message; the information obtaining unit 824 is configured to obtain application point information and configuration parameter information corresponding to the indication message received by the receiving unit 822; the executing unit 826 is configured to use the configuration parameter at the application point obtained by the information obtaining unit 824. The configuration parameter includes cell antenna information or system bandwidth information. The indication message is used to instruct the terminal 820 to use the configuration parameter at the application point. The base station is configured to use the configuration parameter at the application point corresponding to the application point information.

Further, the application point is starting point of modification periods of a system message or other SFNs except the starting point of the modification periods of a system message.

Further, the indication message is a paging message indicating a change of the number of cell antennas or a change of the system bandwidth, or a radio resource control connection reconfiguration message.

The configuration parameter includes the indication information indicating either a change of the number of cell antennas or a change of the system bandwidth.

Figure 6:
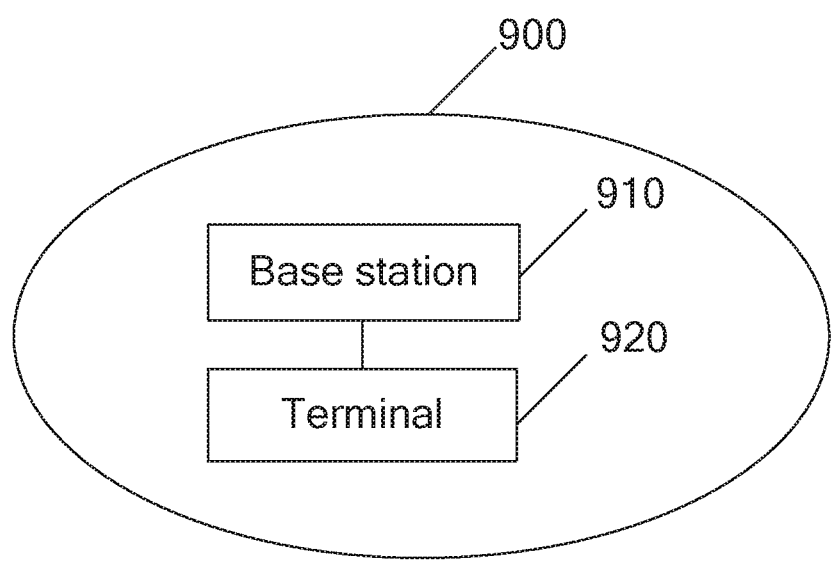
FIG. 6 is a schematic diagram of a system for regulating power consumption according to an embodiment of the present invention.

Further, the configuration parameter further include system information affecting connection status of the terminal, and information about a transmission mode after the number of cell antennas is changed As shown in FIG. 6, an embodiment of the present invention a system 900 for regulating power consumption, including a base station 910.

The base station 910 is configured to obtain application point and configuration parameter, and sends an indication message to the terminal 920 according to the application point and configuration parameter. The terminal 920 is configured to obtain the application point and configuration parameter according to the received indication message. The configuration parameter includes cell antenna information or system bandwidth information, and the indication message instructs the terminal 920 to use the configuration parameter at the application point.

Further, the system 900 may also include: a terminal 920.

Further, the base station 910 in the system 900 regulating for the power consumption according to this embodiment is further configured to:

obtain the application point and configuration parameter according to a trigger factor.

The trigger factor includes one of cell load, a selected time point, and traffic.

Further, in this embodiment, the application point are starting point of modification periods of a system message or other SFNs except the starting point of the modification periods of a system message.

Further, the indication message is a paging message indicating a change of the number of cell antennas or a change of the system bandwidth; or a radio resource control connection reconfiguration message.

Further, the indication message includes the application point and configuration parameter.

Further, the configuration parameter includes the indication information indicating either a change of the number of cell antennas or a change of the system bandwidth. The configuration parameter may further include system information, and information about a transmission mode after the number of cell antennas is changed.

Further, the application point are the preset time points on the base station 910 and the terminal 920; the configuration parameter are the preset cell antenna information or system bandwidth information at the base station 910 and the terminal 920.

In the embodiments of the present invention, a base station may be a macro-cell base station, micro-cell base station, home NodeB (HomeNB) or evolved Node B (eNB).

It is understandable to those skilled in the art that all or part steps of the preceding methods can be implemented by hardware following instructions of programs. The programs may be stored in a computer readable storage medium. The storage medium may be a read only memory (ROM), random access memory (RAM), a magnetic disk or a compact disk.

In conclusion, the above are merely exemplary embodiments of the present invention. The scope of the present invention is not limited thereto. Variations or replacements readily apparent to persons skilled in the prior art within the technical scope of the present invention should fall within the protection scope of the present invention. Therefore, the protection scope of the present invention is subjected to the appended claims.

The invention claimed is:

1. A non-transitory computer readable storage medium, comprising computer program code, which, when executed by a processor, will cause the processor to perform:
   obtain an application point and changed number of cell antennas to be applied at the application point, the application point being a starting point of a modification period of a system message or a system frame number (SFN) of other SFNs except the starting point of the modification period of a system message;
   send to a terminal an indication for the terminal to acquire the application point; and
   apply the changed number of the cell antennas at the application point which is a same moment for the terminal to apply the changed number of the cell antennas.

2. The non-transitory computer readable storage medium according to claim 1, wherein the application point is used for the terminal to detect the changed number of the cell antennas and apply the changed number of the cell antennas at the application point.

3. The non-transitory computer readable storage medium according to claim 2, wherein the processor further sends to the terminal a transmission mode associated with the changed number of the cell antennas.

4. The non-transitory computer readable storage medium according to claim 2, wherein the processor further presets a transmission mode associated with the changed number of the cell antennas for the terminal.

5. The non-transitory computer readable storage medium according to claim 2, wherein the processor further instructs the terminal to change currently-applying number of the cell antennas into the changed number of the cell antennas detected by the terminal.

6. The non-transitory computer readable storage medium according to claim 2, wherein the processor further triggers the receiver to obtain the application point and the changed number of cell antennas in accordance with a trigger factor, wherein the trigger factor comprises one or more of: cell load, a selected time point, or traffic.

7. The non-transitory computer readable storage medium according to claim 2, wherein the indication is a paging message or a radio resource control connection reconfiguration message.

8. A non-transitory computer readable storage medium, comprising computer program code, which, when executed by a processor, will cause the processor to perform:
   obtain an application point instructed by a base station, the application point being a starting point of a modification period of a system message or a system frame number (SFN) of other SFNs except the starting point of the modification period of a system message, for both of a terminal and the base station to apply changed number of the cell antennas;
   apply the changed number of the cell antennas at the application point which is a same moment for the base station to apply the changed number of the cell antennas.

9. The non-transitory computer readable storage medium according to claim 8, wherein the processor further detects the changed number of the cell antennas in accordance with the application point.

10. The non-transitory computer readable storage medium according to claim 9, wherein the processor further receives from the base station a transmission mode associated with the changed number of the cell antennas.

11. The non-transitory computer readable storage medium according to claim 9, wherein the processor is further acquires a transmission mode associated with the changed number of the cell antennas preset by the base station.

12. The non-transitory computer readable storage medium according to claim 9, wherein the processor further receives an instruction from the base station to change currently-applying number of the cell antennas into the changed number of the cell antennas.

13. The non-transitory computer readable storage medium according to claim 9, wherein the processor further obtains the application point instructed by paging message or a radio resource control connection reconfiguration message.

\* \* \* \* \*